United States Patent [19]
McEachern

[11] Patent Number: 6,062,140
[45] Date of Patent: May 16, 2000

[54] MAGNETIC CYLINDER WITH PRESSURIZED AIR HOLES

[75] Inventor: David A. McEachern, St. Paul, Minn.

[73] Assignee: T. D. Wright, Inc., St. Paul, Minn.

[21] Appl. No.: 09/309,624

[22] Filed: May 10, 1999

[51] Int. Cl.[7] .................................................. B41F 27/00
[52] U.S. Cl. ........................................ 101/389.1; 335/306
[58] Field of Search ................................ 335/296–306; 101/389.1, DIG. 36

[56] References Cited

U.S. PATENT DOCUMENTS

| | | | |
|---|---|---|---|
| 4,062,321 | 12/1977 | Greenig | 118/623 |
| 4,150,622 | 4/1979 | Stollenwerk et al. | 101/389.1 |
| 4,259,550 | 3/1981 | Nakamatsu | 369/256 |
| 4,940,207 | 7/1990 | Katsuyama | 251/65 |
| 5,627,505 | 5/1997 | Iwaszek | 335/302 |
| 5,777,403 | 7/1998 | Yuan | 310/12 |

*Primary Examiner*—Michael L. Gellner
*Assistant Examiner*—Raymond Barrera
*Attorney, Agent, or Firm*—Jacobson and Johnson

[57] ABSTRACT

A magnetic cylinder for printing plates and the like has an air manifold within the body of the cylinder for applying the force of pressurized air against the plate when mounting the plate onto the cylinder to enable the plate to be accurately registered on the cylinder before it is magnetically latched onto the cylinder.

5 Claims, 2 Drawing Sheets

MAGNETIC CYLINDER WITH PRESSURIZED AIR HOLES

FIELD OF THE INVENTION

This invention is in the field of curved surface magnetic latching or holding devices in the form of magnetic cylinders which are used for magnetically holding printing plates and rotary dies and the like during the printing and/or die cutting operation.

DESCRIPTION OF THE PRIOR ART

Magnetic cylinders for printing plates, rotary dies and the like are well-known. In general, the magnetic cylinder has a central core and radially extending magnets and pole pieces. The cylinder may have a hollow center or axial area for mounting on a shaft or may have a shaft extending out of each end for mounting to a suitable driving mechanism.

Typically a magnetic cylinder may be constructed in the fashion as described in U.S. Pat. No. 5,627,505 by Iwaszek titled MAGNETIC CYLINDER WITH AXIAL EXTENDING PERMANENT BAR MAGNETS. As described in the aforementioned patent, a series of ceramic permanent bar magnets are placed parallel to one another lengthwise to extend in an axial direction across the length of the drum of nonmagnetic material at the outer surface of the drum with pole pieces between and in contact with adjacent magnets. These series of magnets and pole pieces cover most of the outer periphery of the drum to provide a magnetic force for holding a magnetically permeable printing plate or die or the like firmly in position on the cylinder even at the high speeds encountered in today's manufacturing and printing processes.

When the plate or die is to be mounted on the cylinder it must be accurately mounted at a fairly exact location since the printing and/or die cutting is done usually in conjunction with other printing or die cutting steps so that accurate registration is essential. However, because of the strong pull of the magnetic field on the metal printing slate it often becomes difficult to properly adjust the location of the plate or die on the cylinder during the initial setup. The magnetic force tends to pull and hold the magnetically permeable plate tightly onto the cylinder as soon as it nears the cylinder. When that happens a great deal of effort is needed to accurately position the plate.

The prior art includes non-magnetic printing cylinders. In some of these a plate in the form of a tight fitting cylindrical sleeve may be placed over the non-magnetic cylinder. To make it easier to slip the sleeve over the cylinder, pressurized air is used to form a very thin air film or layer as a lubricant on the outside of the cylinder while the sleeve is being placed over the cylinder so the sleeve will slide onto the cylinder easier.

SUMMARY OF THE INVENTION

A magnetic drum or cylinder of the nature described hereinabove for use with printing plates or dies or the like has a main air passageway or conduit extending in an axial direction in the body of the cylinder, preferably along the axis, with an inlet opening at one end and has a number of air passageways extending radially outward to the outer periphery or surface of the cylinder from the main air passageway. A source of pressurized air is connected to the inlet opening of the main air passageway and the pressurized air provides a force acting outwardly from the surface of the cylinder on the printing plate in opposition to the magnetic force of the cylinder which is pulling the plate toward the cylinder to thereby allow and facilitate the maneuvering or manipulation of the printing plate when setting it up initially so that it will be placed in the proper alignment. When the plate has been properly positioned, the air pressure is removed to magnetically latch the plate firmly to the cylinder.

DESCRIPTION OF THE PREFERRED EMBODIMENTS

Figure 1:
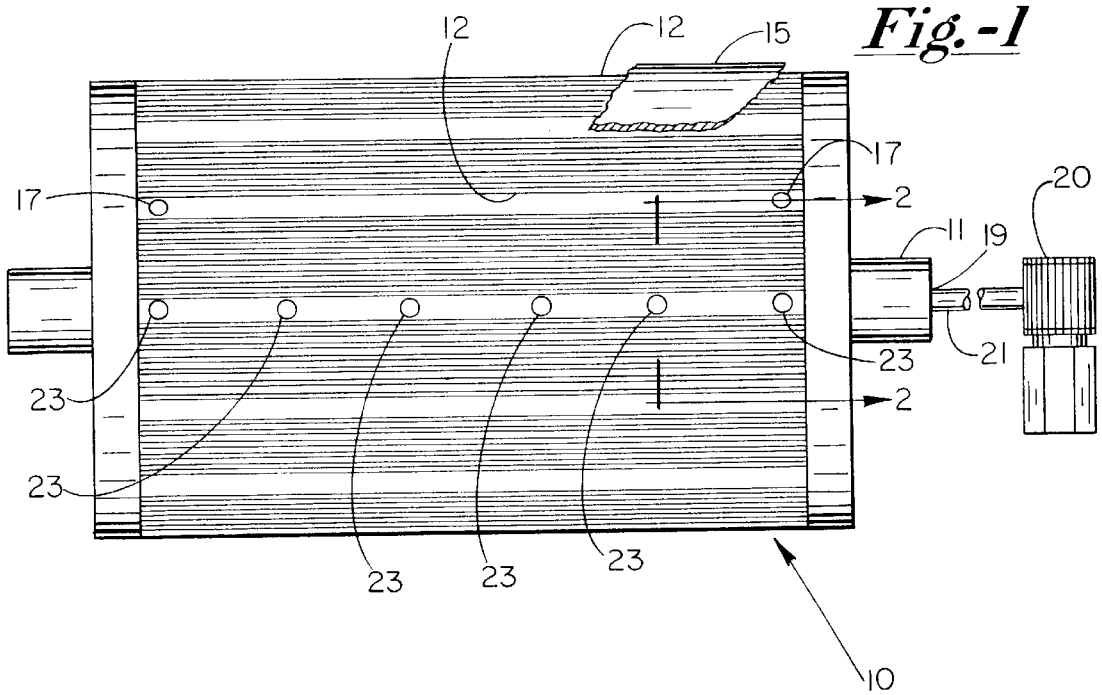
FIG. 1 is a general plan view of a magnetic cylinder utilized in the preferred embodiment of the invention.
Figure 2:
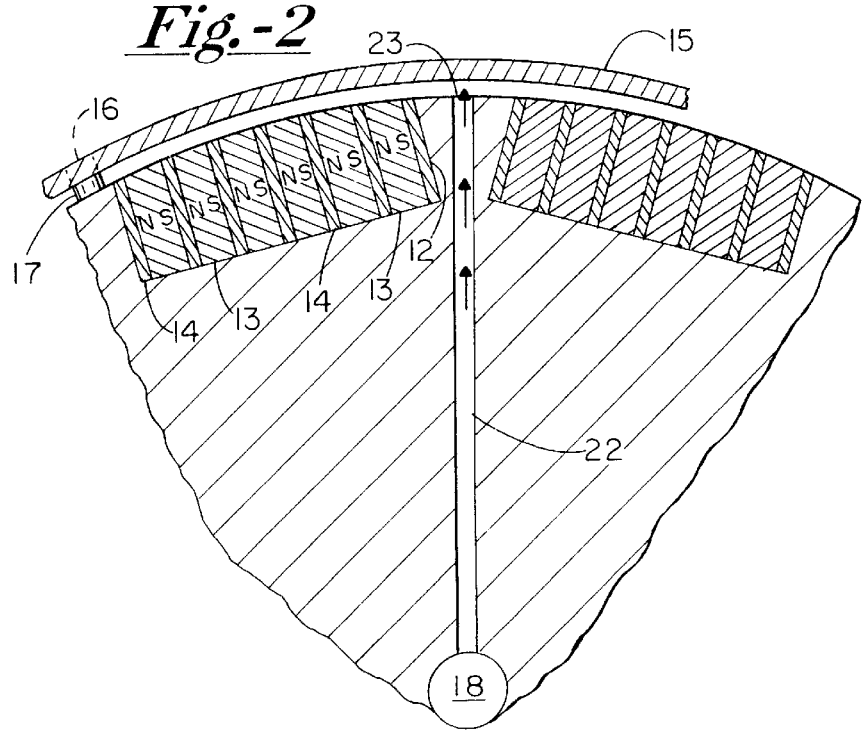
FIG. 2 is a sectioned view as taken along viewing lines 2—2 of FIG. 1.
Figure 3:
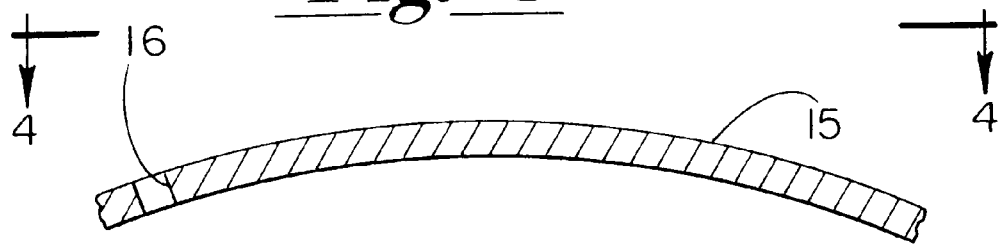
FIG. 3 is a sectioned side view of a form of a curved or arcuate printing plate or the like for mounting on the magnetic cylinder.
Figure 4:
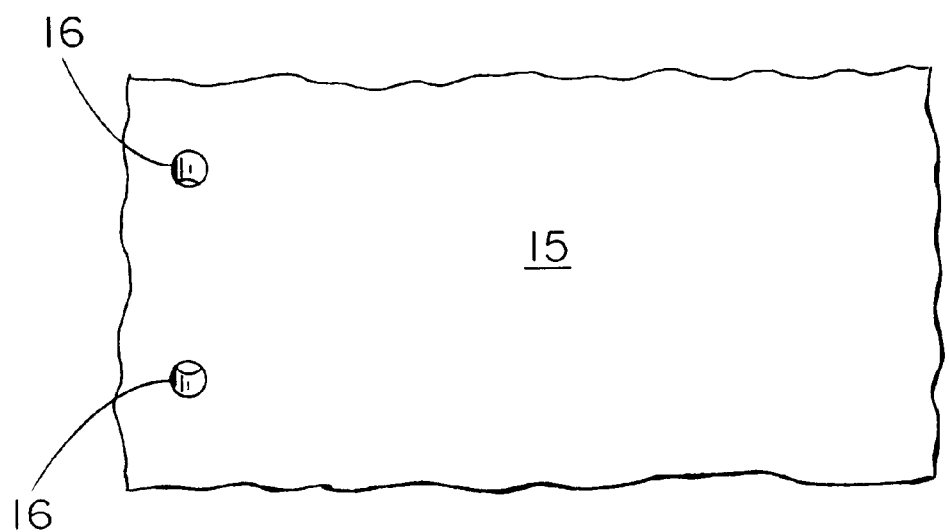
FIG. 4 is an underside view of a section of a printing plate.

A commercially available magnetic cylinder 10 for use with printing plates or the like may be made of a drum of nonmagnetic material with a conventional axial shaft 11. Alternatively, it may be a drum of steel but with suitable magnetic insulators. A magnetic cylinder of this nature is illustrated and described in U.S. Pat. No. 5,627,505. A stack of magnetic elements comprising a number of elongated hard ceramic permanent bar magnets 13 with interspaced pole pieces 14 may be mounted or inserted into recesses or slots 12 which are formed on the outer portion of the drum and extend lengthwise in an axial direction across the drum from side to side. In general, a curved or arcuate printing plate 15, such as shown in very simple form in FIGS. 3 and 4, is made out of a magnetically permeable material and is generally placed on the outer periphery of the cylinder 10 and firmly held in place by the magnetic attraction of the magnets and pole pieces on the cylinder. In general printing plate 15 may have indexing holes 16 for engaging registration pins 17 extending radially out from the outer surface of cylinder 10 in order to properly register the printing plate on the cylinder in a fashion illustrated in FIG. 2. There are other ways of aligning or registering the plate to the cylinder, including by merely eyeballing. A problem that occurs in mounting the printing plate onto the magnetic cylinder is that because of the strong magnetic force acting on the printing plate from the cylinder when the operator brings the plate near the cylinder and tries to align the plate, such as by aligning the index holes 16 on the plate with the registration pins 17 on the cylinder, if he or she is not quite accurate the plate may latch onto the cylinder with the pins not mated with their corresponding indexing holes. The operator then has to pull the plate away from the cylinder (requiring some significant effort) and then try again to get the holes and pins into registration.

The present invention provides a main air passageway 18 extending along the axis of shaft 11 and cylinder 10, or, alternatively elsewhere in the body of the drum but generally parallel to the axis, with passageway 18 having an input opening 19 at the end of the shaft coupled to a source of pressurized air 20 in some convenient and conventional fashion such as by a hose or conduit 21. Connected to main air passageway 18 are a series of radially extending passageways 22 in the body of cylinder 10 having air outlet openings 23 at the outer surface of the cylinder. The pressurized air as illustrated by arrows in FIG. 2 exiting the output ports 23 applies a force against the underside of printing plate 15 conteracting or opposing the magnetic force which is pulling or trying to latch the printing plate onto the cylinder. The force supplied by the air striking the underside of the plate is great enough so that the operator is able to keep the printing plate from latching onto the magnetic cylinder which allows the operator to maneuver the printing plate to bring the indexing holes 16 and their corresponding registration pins 17 into alignment and registration with much less effort than previously required. When the plate is in register then the air pressure can be turned off so printing plate 15 magnetically latches onto cylinder 10 in its proper registered position.

In general air outlet ports 23 may be generally located throughout the breadth of the cylinder and the number of radially extending passageways 22 with their corresponding outlet ports will depend upon the nature of the application. Also, the pressure of the air will vary upon each application. It may be possible to develop a formula for the number of exit ports and their location along with air pressure but in general it is probably a matter of trial and error.

The main proviso is that air pressure of sufficient force be applied to the underside of the plate in direct opposition to the magnetic force of the magnetic cylinder to allow the plate to be maneuvered to bring it into proper registration before it firmly latches onto the cylinder.

I claim:

1. For use in mounting a printing plate or the like, onto a magnetic cylinder, in combination:

a) an arcuate magnetically permeable printing plate;

b) a magnetic cylinder having a magnetic force at its outer surface for magnetically attracting and latching onto said printing plate when said printing plate is in close proximity to said cylinder;

c) a main air passageway within the magnetic cylinder, said main passageway having an inlet opening;

d) a source of pressurized air coupled to said inlet opening; and e) air passageways connected to said main air passageway extending radially to the outer surface of the cylinder for directing the pressurized air from said main passageway against said printing plate with a force in opposition to the magnetic attracting force of the cylinder on the printing plate when said printing plate is in close proximity to said cylinder.

2. The invention as described in claim 1 wherein said main passageway extends in an axial direction.

3. A method for accurately mounting a magnetically permeable plate onto a magnetic cylinder comprising the steps of:

a) applying pressurized air radially outward at the surface of the magnetic cylinder against the printing plate with a force in opposition to the magnetic force of the magnetic cylinder on the plate;

b) moving the plate near the cylinder and maneuvering it until it is in proper registration with respect to the cylinder; then c) removing the pressurized air to magnetically latch the plate onto the magnetic cylinder.

4. The method for accurately mounting a plate onto a magnetic cylinder as described in claim 3 wherein the pressurized air is applied through an inlet opening into a main passageway in the magnetic cylinder and through radially extending passageways coupled to the main passageway.

5. The method as described in claim 4 wherein the pressurized air is applied through a main passageway which extends generally in an axial direction in the magnetic cylinder.

* * * * *